(12) United States Patent
Hanby et al.

(10) Patent No.: US 10,883,869 B2
(45) Date of Patent: Jan. 5, 2021

(54) RETAINER FOR A MOVEABLE ARM OF A FLUID LEVEL SENSOR

(71) Applicant: Walbro LLC, Tucson, AZ (US)

(72) Inventors: Jeffrey D. Hanby, Cass City, MI (US); Douglas W. Salowitz, Jr., Palms, MI (US)

(73) Assignee: Walbro LLC, Tucson, AZ (US)

( * ) Notice: Subject to any disclaimer, the term of this patent is extended or adjusted under 35 U.S.C. 154(b) by 281 days.

(21) Appl. No.: 15/848,684

(22) Filed: Dec. 20, 2017

(65) Prior Publication Data

US 2018/0172498 A1 Jun. 21, 2018

Related U.S. Application Data

(60) Provisional application No. 62/436,753, filed on Dec. 20, 2016.

(51) Int. Cl.
*G01F 23/36* (2006.01)

(52) U.S. Cl.
CPC .................... *G01F 23/363* (2013.01)

(58) Field of Classification Search
CPC ..................................... G01F 23/363
See application file for complete search history.

(56) References Cited

U.S. PATENT DOCUMENTS

| 6,761,193 | B1 | 7/2004 | Cotton et al. | |
|---|---|---|---|---|
| 6,868,724 | B2 * | 3/2005 | Brzozowski | G01F 23/36 73/317 |
| 6,886,403 | B2 * | 5/2005 | LaBarge | G01F 23/363 |
| 9,217,403 | B1 | 12/2015 | Cotton et al. | |

* cited by examiner

*Primary Examiner* — Randy W Gibson
*Assistant Examiner* — John M Royston
(74) *Attorney, Agent, or Firm* — Reising Ethington P.C.

(57) ABSTRACT

In at least some implementations, a fluid level sensor assembly includes a housing, a sensor element carried by the housing, an arm that moves relative to the sensor element, a saddle coupled to at least part of the arm to retain the position of the arm relative to the sensor element, and a retainer. The retainer is coupled to the saddle and overlies a portion of the saddle, the arm or both, to inhibit decoupling of the arm from the saddle.

20 Claims, 2 Drawing Sheets

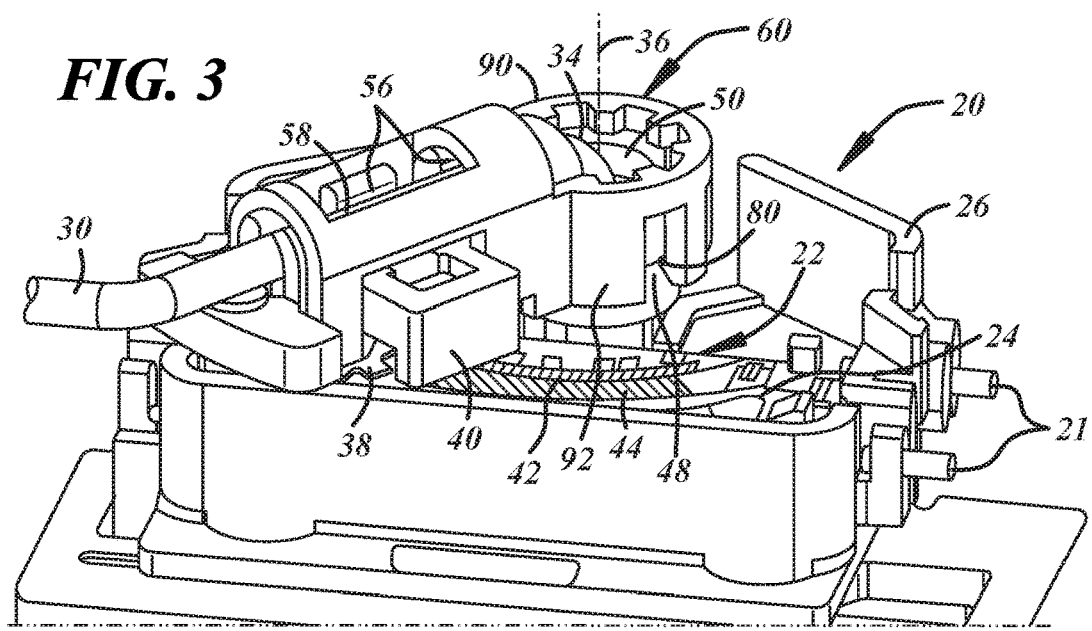
FIG. 3
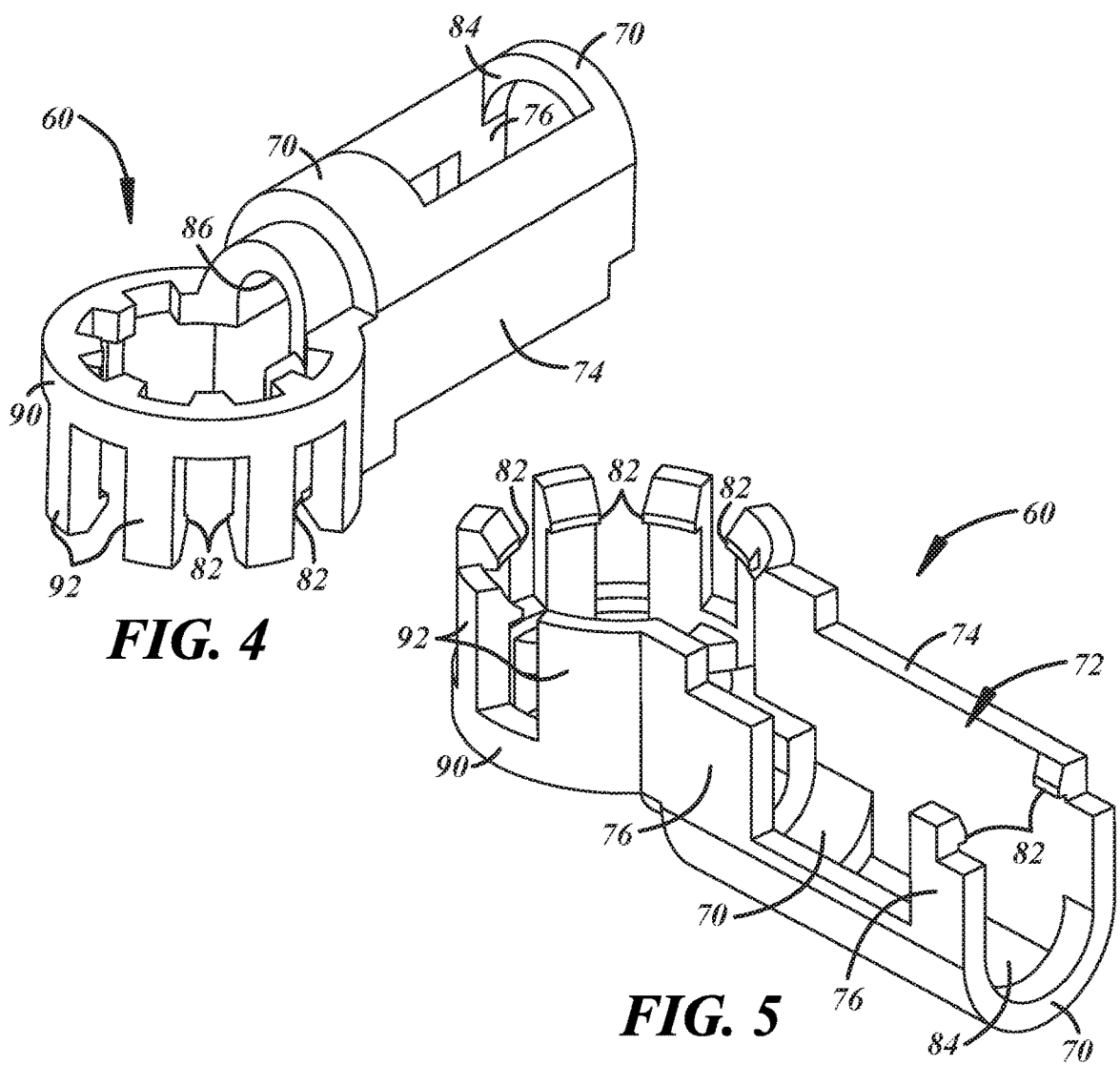
FIG. 4
FIG. 5

RETAINER FOR A MOVEABLE ARM OF A FLUID LEVEL SENSOR

REFERENCE TO RELATED APPLICATIONS

This application claims the benefit of U.S. Provisional Application Ser. No. 62/436,753 filed on Dec. 20, 2016, the entire contents of which is incorporated herein by reference in its entirety.

TECHNICAL FIELD

The present disclosure relates generally to fluid level sensors having a moveable arm, and more particularly, to a retainer for such fluid level sensors.

BACKGROUND

Some fuel level sensors include a float linked to a wiper of a variable resistor assembly by an arm. As the level of fuel within a fuel tank changes, the float member and arm move and thereby cause the wiper to slide over the variable resistor to change an effective resistance of the variable resistor which corresponds to the fuel level. Accordingly, the sensed fuel level is dependent upon the position of the wiper relative to the variable resistor. If the arm becomes loose, or misaligned, the wiper may not effectively or accurately engage the variable resistor.

SUMMARY

In at least some implementations, a fluid level sensor assembly includes a housing, a sensor element carried by the housing, an arm that moves relative to the sensor element, a saddle coupled to at least part of the arm to retain the position of the arm relative to the sensor element, and a retainer. The retainer is coupled to the saddle and overlies a portion of the saddle, the arm or both, to inhibit decoupling of the arm from the saddle.

In at least some implementations, the saddle is pivotally coupled to the housing, and the arm and saddle pivot relative to the housing. The saddle and retainer may include overlapped stop surfaces and catches that retain the retainer on the saddle. The saddle may include multiple resilient fingers that define at least part of a channel in which part of the float arm is received, and the retainer may inhibit movement of the fingers in a direction enlarging the channel to inhibit removal of the arm from the channel. The fingers may be arranged along a longitudinal length of the channel and the retainer may include a longitudinally extending first sidewall adjacent to at least one finger along a first side of the channel and a longitudinally extending second sidewall adjacent to at least one finger along a second side of the channel. The retainer may further include a base interconnecting the first sidewall and the second sidewall and overlapping the arm. The direction of the assembly of the retainer onto the saddle may be opposite to the direction in which the arm is removed from the saddle. The retainer may be snap-fit onto the saddle, and the saddle may be snap-fit onto the housing.

In at least some implementations, a retaining device for a portion of a fluid level sensor, includes a retainer having a longitudinally extending first sidewall, a longitudinally extending second sidewall, and a base interconnecting the first sidewall and the second sidewall. A void is defined between the sidewalls and the base, the void being open along an edge of the sidewalls opposite to the base. The first sidewall includes at least one catch extending generally laterally toward the second sidewall and the second sidewall includes at least one catch extending generally laterally toward the first sidewall, the catches defining a minimum lateral width of the void.

In at least some implementations, at least one sidewall or at least one catch is a flexible feature that flexes to permit an increase of the minimum lateral width of the void under a force and the flexible feature is resilient to return to or toward an unflexed position when the force is removed. The retainer may have a boss that has a sidewall that defines at least part of an open interior of the boss, and the sidewall of the boss may include at least one catch extending inwardly toward the open interior. The sidewall of the boss may include at least one gap defining at least one flexible finger where the finger includes an inwardly extending catch.

In at least some implementations, the device may further include a saddle that has multiple resilient fingers that define at least part of a channel, and the retainer may be coupled to the saddle and may overlie at least part of the channel, and inhibit movement of the fingers in a direction enlarging the channel. The fingers of the saddle may have free ends that define a minimum width of the channel, and the retainer may overlap the fingers and inhibit outward movement of the fingers. The saddle may further include an annular boss that defines an opening, and the retainer may include a boss having a sidewall that defines at least part of an open interior of the retainer boss, and the sidewall of the boss may include at least one catch extending inwardly toward the open interior. The saddle may include at least one stop surface that is overlapped by a catch of the retainer.

BRIEF DESCRIPTION OF THE DRAWINGS

The following detailed description of certain embodiments and best mode will be set forth with reference to the accompanying drawings, in which:

FIG. 3 is another perspective view of a portion of the fuel level sensor assembly;

FIG. 4 is a perspective top view of a retainer for a float arm of the fuel level sensor assembly; and FIG. 5 is a perspective bottom view of a retainer for a float arm of the fuel level sensor assembly.

DETAILED DESCRIPTION

Figure 1:
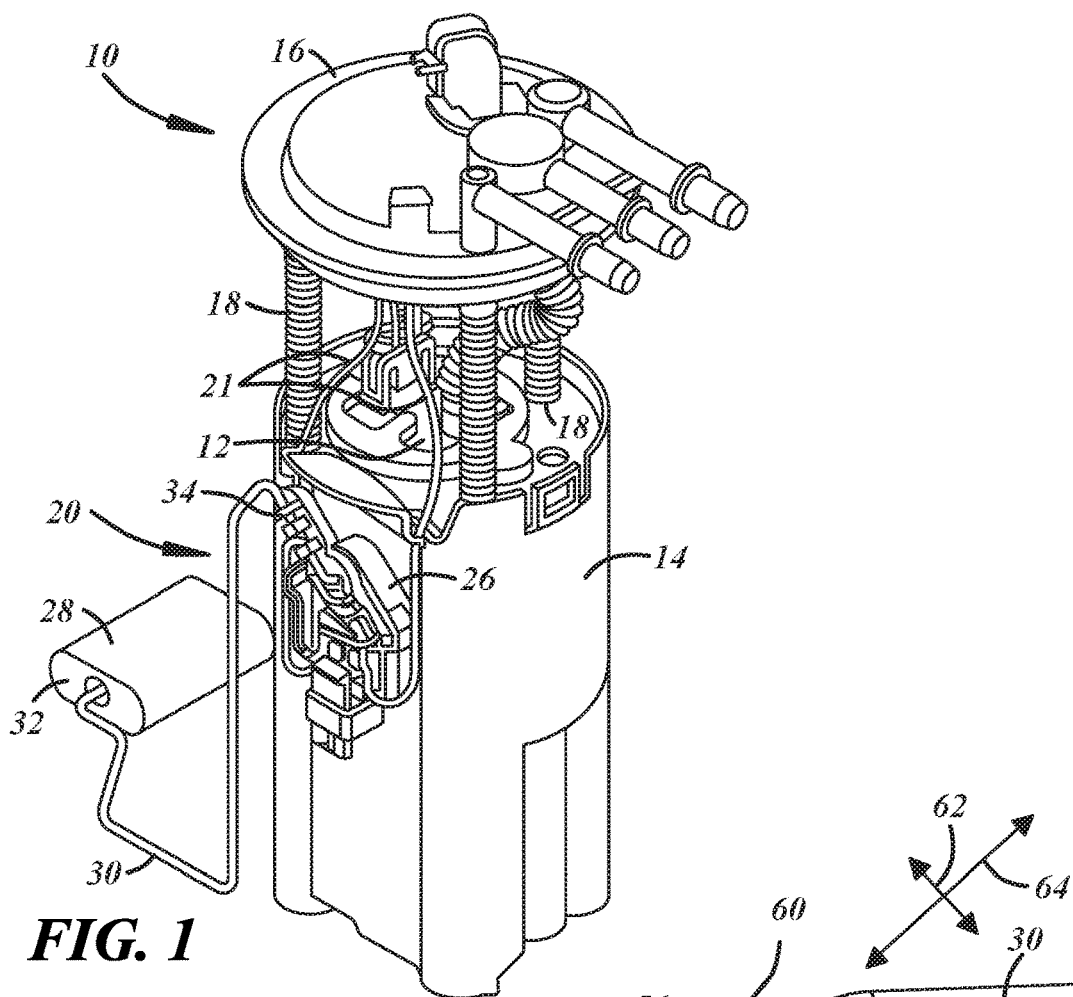
FIG. 1 a perspective view of a fuel pump module that may be received within a fuel tank to pump fuel from the fuel tank, and which includes a fuel level sensor assembly to provide an indication of the level of fuel within the fuel tank.
Figure 2:
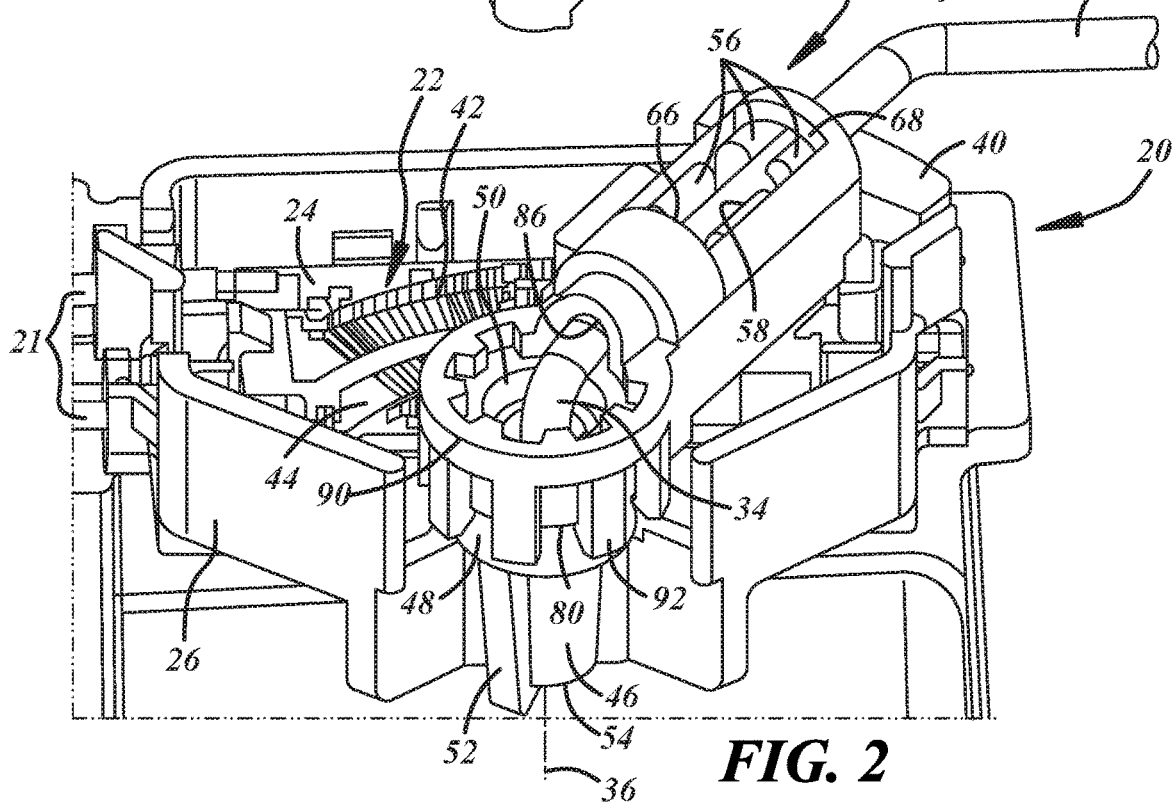
FIG. 2 is a perspective view of a portion of the fuel level sensor assembly.

Referring in more detail to the drawings, FIG. 1 illustrates a pump module 10 adapted to be inserted into a fuel tank to pump fuel from the tank and deliver it under pressure to an engine. The pump module 10 may have an electric motor driven fuel pump 12 carried in a canister or reservoir 14 suspended from a flange 16 by one or more posts 18. When fully assembled to the tank, the flange 16 is sealed to the fuel tank, and the pump 12 and reservoir 14 are suspended within an interior of the fuel tank. The fuel pump module 10 also has a fuel level sensor assembly 20 that sends a fuel level signal, via a pair of electric wires 21, to a fuel level indicator or meter which data or information may be used by a controller (e.g. an engine control module or processor) and/or displayed to inform a user of the level of fuel within the tank. In the implementations shown in FIGS. 2 and 3, the wires 21 are connected to a variable resistor 22 on a card 24 received within a housing 26 carried by the reservoir 14, flange 16 or a post 18. Other arrangements may be implemented as desired. For example, without limitation, the reservoir 14 may engage or be carried by a wall of the tank, including by a lower wall of the tank, without any flange 16. Further, while described with regard to a fuel system, the module 10 may be used in other applications to pump a fluid other than fuel.

The level sensor 20 includes a fuel level responsive member 28 coupled to the variable resistor 22 so that as the fuel level changes, the resistance in a circuit including the variable resistor changes. The resistance in the circuit corresponds to the fuel level in the tank and the resistance in the circuit at a given time may be determined by a device (e.g. a processor or controller) coupled to the wires 21. The fuel level responsive member may be a float 28 (FIG. 1) that is buoyant in the liquid fuel and hence, floats upon the surface of the fuel in the tank. The float 28 may be coupled to the variable resistor 22 by an arm 30 (FIGS. 1-3) that has a first end 32 coupled to the float 28 so that the arm 30 moves with the float 28 and a second end 34 carried pivotally by the housing 26 to pivot about an arm axis 36. To couple the arm to the resistor 22, electrical contacts 38 (FIG. 3) may be carried by a saddle or float arm retainer 40 that is attached to or carried by the second end 34 of the float arm 30. The electrical contacts 38 engage and electrically interact with conductive contact elements 42 of the resistor 22, as set forth below.

As the fuel level in the tank changes, the float 28 rises or lowers with the fuel surface causing the arm 30 to pivot at the second end 34 and axis 36, thus wiping or sweeping the contacts 38 across an array of the contact elements 42 of the variable resistor 22. As the position of the contacts 38 changes due to movement of the float arm 30, the contacts 38 engage different contact elements 42 on the resistor and the circuit has a different overall resistance as a result of the moved contacts 38. The resistance in the circuit at any given time can be correlated to a fuel level within the tank.

In more detail, the contact elements 42 of the resistor 22 may be carried by (e.g. imprinted upon) the circuit board or card 24 and generally arranged side-by-side forming a semi-circular or arcuate orientation to preferably coincide with the pivoting axis 36 of the float arm 30 and the position of the contacts 38 that are associated with the float arm 30. The resistor 22 is connected electrically to one of the two wires 21. The second wire 21 is electrically connected to a neutral or resistive contact 44 or array of such contacts also arranged on the card 24 and preferably coinciding with the pivot axis 36. The contact 44 is spaced radially from and may extend next to the contact elements 42 so that one of the electrical contacts 38 associated with the float arm 30 engages a contact element 42 and another contact 38 associated with the float arm 30 engages the contact 44 to electrically couple or bridge the elements 42 and contact 44. The electrical resistance of variable resister 32 changes as the position of the contacts 38 relative to the contacts 42, 44 change due to movement of the float arm 30 caused by movement of the float 28 that is responsive to changes in fuel level in the fuel tank.

In the example shown, the housing 26 includes a boss 46 having an opening through which a portion of the float arm 30 extends. The second end 34 of the float arm 30 may be bent and received within the opening or boss 46 so that the opening and second end 34 are coaxially arranged and define the pivot axis 36 of the float arm. The saddle 40 may include a boss 48 having an opening 50 received around part of the boss 46 or otherwise aligned therewith. This may facilitate consistent placement of the float arm 30 and saddle 40 relative to the housing 26, card 24 and variable resistor 22 from one level sender to the next within a production run of such components.

The saddle 40 may be snap-fit to the housing 26, such as by one or more retention elements 52 (FIG. 2) that resiliently flex when passed over a catch surface 54 and then returned to an unflexed position overlapping and opposed to the catch surface to inhibit removal of the saddle from the housing. The float arm 30 may likewise be snap-fit to the saddle 40 to retain the float arm relative to the saddle. To this end, the saddle 40 includes resilient fingers 56 arranged on either side of and defining part of a channel 58 in which a portion of the float arm 30 is received. The fingers 56 may be coupled at one end to the saddle 40 and have free ends that are angled inwardly toward the channel 58 or have bent portions that partially overlie the channel 58. In their at rest state, the fingers 56 define an entrance to the channel 58 that is smaller than the float arm 30 (e.g. an outer diameter of the portion of the float arm to be received within the channel). As the float arm 30 is inserted into the channel 58, the float arm engages and initially outwardly flexes the fingers 56. Upon further movement of the float arm 30 into the channel 58, the float arm passes beyond the interfering portions of the fingers 56, and the fingers resiliently return to or toward their at rest positions with a portion of the fingers (e.g. the interfering portions) overlapping the float arm to resist removal of the float arm from the channel.

In use, the float arm 30 may become partially or fully dislodged from the saddle 40. While the reasons why are not important, this may happen due to forces on the float arm 30 as fuel sloshes within the tank and acts on the float 28, due to deterioration of the saddle material in the liquid fuel or over time, or otherwise. Decoupling of the float arm 30 from the saddle 40 decouples the float 28 from the resistor 22 which inhibits or prevents an accurate fuel level determination.

To maintain the float arm 30 coupled to the saddle 40, a retainer 60 is provided that overlaps part of the float arm 30 and one or both of the saddle 40 and the housing 26. In the implementation shown, the saddle 40, in the area that defines the channel 58 and receives the float arm 30, is generally U-shaped with an open entrance area in line with the channel and into which the float arm may be received into the channel. The entrance area may be defined along the length of the channel 58 and between laterally opposed walls or fingers 56 of the saddle 40 that define the legs of the U, where a base (not shown but beneath the float arm) of the saddle 40, which defines the bottom of the channel 58 against which the float arm is received, interconnects the legs of the U. The channel 58 and hence, the saddle 40, may have any desired longitudinal length, and any desired number of fingers 56 may be utilized to capture the float arm 30 in the channel. In the example shown, the lateral distance extends perpendicular to a longitudinal length of the channel 58. The lateral direction is denoted by line 62 in FIG. 2, and the longitudinal direction is denoted by line 64 in FIG. 2 and generally includes the direction from a first end 66 of the channel 58 to a second end 68 of the channel. Both the lateral and longitudinal directions may lie in planes that are generally perpendicular to the axis 36, and the lateral and longitudinal directions may be generally perpendicular to each other. In the context of this disclosure, "generally perpendicular" or "generally parallel" means within 30 degrees of the stated orientation (i.e. generally perpendicular includes orientations that are actually perpendicular as well as orientations within 30 degrees of actually being perpendicular).

As best shown in FIGS. 4 and 5, the retainer 60 may include a base 70 adapted to span and overlap at least a portion of the longitudinal length of an entrance area 72 to thereby overlap the float arm 30 received within the channel 58. Further, the retainer 60 is adapted to be coupled to the saddle 40 with the float arm 30 trapped between the retainer 60 and saddle 40 to inhibit or prevent removal of the float arm from the channel 58. In at least some implementations, at least a portion of the retainer 60 is U-shaped but inverted relative to the saddle 40 so that the retainer base 70 spans or bridges at least part of the saddle channel entrance and legs or sidewalls 74, 76 of the retainer 60 overlap the fingers 56. In at least some implementations, the retainer includes a first sidewall 74, a second sidewall 76 and an opening or entrance area 72 between the sidewalls. The sidewalls 74, 76 may be laterally spaced apart sufficiently to receive the saddle fingers 56 and/or sidewalls of the saddle 40 between the side walls 74, 76 of the retainer 60. The retainer sidewalls 74, 76 preferably lie closely adjacent to the saddle fingers 56 and inhibit or prevent lateral outward movement of the fingers so that the fingers are held in a position overlapping the float arm 30 in the channel 58.

To couple the retainer 60 to the saddle 40, the saddle may include multiple stop surfaces 80 with one stop surface on one side of the saddle and another stop surface on the other side of the saddle, with the channel 58 laterally between the stop surfaces. The retainer 60 may include multiple catches 82 or stop surfaces with at least one on each side of the retainer 60. Each catch 82 is adapted to cooperate with a different one of the saddle stop surfaces 80 as set forth below. The lateral distance between at least part of the catches 82 is less than the minimum lateral distance between the stop surfaces 80 so that the catches laterally overlap the stop surfaces in assembly.

In assembly, the retainer 60 is aligned with the saddle 40 so that the fingers/sidewalls 56 of the saddle 40 are received in the opening 72 of the retainer 60, and the retainer is advanced onto the saddle. The catches 82 of the retainer 60 extend inwardly toward the opening 72 of the retainer 60 with a minimum distance between the catches 82 being less than the distance between the opposite fingers 56 or sidewalls of the saddle 40. Hence, the sidewalls 74, 76 of the retainer 60 and/or the sides of the saddle 40 are flexed as the retainer is pressed onto the saddle until the catches 82 pass the stop surfaces 80 whereupon the resilient retainer and/or saddle unflex and the catches laterally overlap the stop surfaces. The catches 82 and stop surfaces 80 may face in opposite directions and may be generally parallel to each other to inhibit or prevent removal of the retainer 60 from the saddle 40. Further, the catches 82 and stop surfaces 80 may be generally perpendicular to the direction of insertion of the float arm 30 into the channel 58. In this way removal of the float arm 30 from the channel 58 is inhibited or prevented by: 1) the base 70 of the retainer 60 which spans the entrance area along at least part of the longitudinal length of the channel 58; 2) the fingers 56 which laterally overlap at least part of the float arm 30 and are inhibited from lateral outward movement by the retainer sidewalls 74, 76 arranged laterally outboard of the saddle fingers; or 3) both of these features. In the example shown the retainer 60 includes a slot 84 in the base 70 such that two spaced apart portions of the base, one adjacent to each end 66, 68 of the channel 58, laterally span the channel and interconnect the retainer sidewalls 74, 76. Further, the catches 82 may be arranged at or near a free end of the sidewalls 74, 76. Of course, the retainer 60 may be otherwise constructed and arranged, as desired.

The retainer 60 moves with the saddle 40 as the float arm 30 moves, and relative to the housing 26, and may include cutouts or other voids as necessary to avoid interference with the housing 26 or adjacent components. The base 70 may be arcuate, may have a groove 86 (FIGS. 2 and 4) along all or a portion thereof. The groove 86 may be sized to closely receive or engage part of the float arm 30. In the example shown, the groove 86 has an inner dimension that is the same as or slightly smaller than the outer diameter of the float arm 30 so that the float is received in the groove with an interference or snap-fit as the retainer 60 is coupled to the saddle 40. That is, the retainer 60 may engage the saddle 40 to increase the retention of the float arm 30 in the saddle, and the retainer may also engage the float arm to retain the float arm in the saddle.

In at least some implementations, the retainer 60 may also overlap and be coupled to the saddle 40 in the area of the saddle boss 48 which surrounds the second end 34 of the float arm 30 and the float arm axis 36. In the example shown, the saddle 40 includes one or more stop surfaces 80 on the boss 48 which may be oriented similarly to the stop surfaces adjacent to the channel 58 as described above. The retainer 60 may include a mating boss 90 adapted to be received over and surrounding at least part of the saddle boss 48. And the retainer boss 90 may have one or more catches 82 adapted to engage one or more stop surfaces 80 on the saddle boss 48 in a similar manner as described above to further retain the retainer 60 on the saddle 40 and further secure the float arm 30 within the assembly. The boss 90 may have a sidewall 92 that defines at least part of an open interior of the boss in which the saddle boss 48 is received, and may include or be defined by one or more flexible and resilient fingers that include the inwardly extending catches 82 (where inwardly means extending laterally in the direction of the interior of the boss). Gaps or voids between adjacent fingers 92 may facilitate flexing of the fingers as the boss 90 is passed over the saddle boss 48. The retainer 60 may have at least two catches 82 on each side of the channel 58, and the catches 82 on each side may be longitudinally spaced apart and adjacent to the opposite ends of the retainer 60, if desired. Catches 82 or stop surfaces on the bosses 48, 90 may define at least one of the catches 82 or stop surfaces 80 on one or both sides of the channel 58 (i.e., the catches and stop surfaces need not be defined on the sidewalls 74, 76 or sides of the saddle 40.

As set forth herein, in at least some implementations, the retainer 60 may include longitudinally extending first and second sidewalls 74, 76 and a base 70 interconnecting the sidewalls. A void 72 is defined between the sidewalls 74, 76 and the base 70, the void may be open along an edge of the sidewalls opposite to the base. The first sidewall 74 may include at least one catch 82 extending generally laterally toward the second sidewall 76 and the second sidewall may include at least one catch 82 extending generally laterally toward the first sidewall. The catches 82 define a minimum lateral width of the void 72. In assembly, at least a portion of the saddle 40 is received in the void 72 as the retainer 60 is pressed onto the saddle 40. The catches 82 may engage the saddle 40 and flex the catches and/or the sidewalls 74, 76 outwardly as the retainer 60 is assembled onto the saddle 40. Such flexible feature(s) of the retainer 60 may be resilient so that when the catches 82 pass the interfering portion of the saddle 40, the flexible feature(s) return toward the unflexed position. In the unflexed position, the lateral distance between the catches 82 is less than a lateral distance between an overlapped portion of the saddle (which may be defined by corresponding outwardly extending stop surfaces 80). When the retainer 60 is assembled onto the saddle 40, the first and second sidewalls 74, 76 are received laterally outboard of and adjacent to the saddle 40, and may overlie the float arm retaining fingers 56 of the saddle 40 to prevent lateral outward flexing of the fingers and maintain the fingers in position adjacent to the float arm 30. A portion of the base 70 of the retainer 60 may overlie a portion of the float arm 30 and may engage the float arm. The retainer base 70 may include one or more voids (e.g. slots or cutouts 84). The voids 84 reduce the material content of the retainer 60, may improve the flexibility of the flexible features, may provide clearance for certain features of the saddle 40 or other components, and may permit the saddle and float arm 30 to be visible through the retainer to facilitate assembly and enable visual confirmation that the retainer 60 is fully seated on the saddle.

The retainer 60 may be formed from a single piece of material wherein the sidewalls 74, 76, base 70 and boss 90 are all integral features defined in one component. The retainer 60 can conveniently be molded from a plastic or composite material and easily and quickly snap-fit onto the saddle in assembly to more securely retain the float arm 30 in use.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A fluid level sensor assembly, comprising:
a housing;
a sensor element carried by the housing;
an arm that moves relative to the sensor element;
a saddle coupled to at least part of the arm to retain the position of the arm relative to the sensor element; and
a retainer coupled to the saddle so that the retainer moves with the saddle as the saddle moves with the arm, and wherein the retainer overlies a portion of the saddle, the arm or both, to inhibit decoupling of the arm from the saddle.

2. The assembly of claim 1 wherein the saddle is pivotally coupled to the housing, and the arm and saddle pivot relative to the housing.

3. The assembly of claim 1 wherein the saddle and retainer include overlapped stop surfaces and catches that retain the retainer on the saddle.

4. The assembly of claim 1 wherein the saddle includes multiple resilient fingers that define at least part of a channel in which part of the float arm is received and wherein the retainer inhibits movement of the fingers in a direction enlarging the channel to inhibit removal of the arm from the channel.

5. The assembly of claim 4 wherein the fingers are arranged along a longitudinal length of the channel and the retainer includes a longitudinally extending first sidewall adjacent to at least one finger along a first side of the channel and a longitudinally extending second sidewall adjacent to at least one finger along a second side of the channel.

6. The assembly of claim 5 wherein the retainer includes a base interconnecting the first sidewall and the second sidewall and overlapping the arm.

7. The assembly of claim 1 wherein the direction of the assembly of the retainer onto the saddle is opposite the direction in which the arm is removed from the saddle.

8. The assembly of claim 3 wherein the retainer is snap-fit onto the saddle.

9. The assembly of claim 8 wherein the saddle is snap-fit onto the housing.

10. A retaining device for a portion of a fluid level sensor, comprising:
a retainer having a longitudinally extending first sidewall, a longitudinally extending second sidewall, and a base interconnecting the first sidewall and the second sidewall with a void defined between the sidewalls and the base, the void being open along an edge of the sidewalls opposite to the base and wherein the first sidewall includes at least one catch extending generally laterally toward the second sidewall and the second sidewall includes at least one catch extending generally laterally toward the first sidewall, the catches defining a minimum lateral width of the void.

11. The device of claim 10 wherein at least one sidewall or at least one catch is a flexible feature that flexes to permit an increase of the minimum lateral width of the void under a force and said flexible feature is resilient to return to or toward an unflexed position when the force is removed.

12. The device of claim 10 wherein the retainer includes a boss having a sidewall that defines at least part of an open interior of the boss, and the sidewall of the boss includes at least one catch extending inwardly toward the open interior.

13. The device of claim 12 wherein the sidewall of the boss includes at least one gap defining at least one flexible finger where the finger includes an inwardly extending catch.

14. The device of claim 10 which also includes a saddle that has multiple resilient fingers that define at least part of a channel and wherein the retainer is coupled to the saddle and overlies at least part of the channel, and the retainer inhibits movement of the fingers in a direction enlarging the channel.

15. The device of claim 14 wherein the saddle includes an annular boss that defines an opening, and wherein the retainer includes a boss having a sidewall that defines at least part of an open interior of the retainer boss, and the sidewall of the boss includes at least one catch extending inwardly toward the open interior.

16. The device of claim 14 wherein the fingers of the saddle include free ends that define a minimum width of the channel, and wherein the retainer overlaps the fingers and inhibits outward movement of the fingers.

17. The assembly of claim 1 wherein the retainer has a longitudinally extending first sidewall, a longitudinally extending second sidewall, and a base interconnecting the first sidewall and the second sidewall with a void defined between the sidewalls and the base, the void being open along an edge of the sidewalls opposite to the base and wherein the first sidewall includes at least one catch extending generally laterally toward the second sidewall and the second sidewall includes at least one catch extending generally laterally toward the first sidewall, the catches defining a minimum lateral width of the void.

18. The assembly of claim 1 wherein the retainer includes a boss having a sidewall that defines at least part of an open interior of the boss, and the sidewall of the boss includes at least one catch extending inwardly toward the open interior.

19. The assembly of claim 1 wherein the saddle includes an annular boss that defines an opening, and wherein the retainer includes a boss having a sidewall that defines at least part of an open interior of the retainer boss, and the sidewall of the boss includes at least one catch extending inwardly toward the open interior.

20. The assembly of claim 4 wherein the fingers of the saddle include free ends that define a minimum width of the channel, and wherein the retainer overlaps the fingers and inhibits outward movement of the fingers.

* * * * *